United States Patent
Losey

(10) Patent No.: US 6,748,308 B2
(45) Date of Patent: Jun. 8, 2004

(54) AUTOMATED CLOSURE SYSTEM AND METHOD

(75) Inventor: Allan D. Losey, Ortonville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 175 days.

(21) Appl. No.: 10/073,771

(22) Filed: Feb. 11, 2002

(65) Prior Publication Data

US 2002/0143452 A1 Oct. 3, 2002

Related U.S. Application Data

(60) Provisional application No. 60/280,022, filed on Mar. 30, 2001.

(51) Int. Cl.$^7$ .............................. G06F 19/00; G06F 7/00
(52) U.S. Cl. ......................... 701/49; 236/49.3; 318/445; 307/116; 454/75
(58) Field of Search .................... 701/49, 36; 236/49.3; 318/445, 466, 467; 340/825.75, 545.2, 545.1; 307/118, 112, 116; 454/75

(56) References Cited

U.S. PATENT DOCUMENTS

| | | | | |
|---|---|---|---|---|
| 4,683,975 A | | 8/1987 | Booth et al. ................. 180/289 |
| 5,054,686 A | * | 10/1991 | Chuang ..................... 236/49.3 |
| 5,259,814 A | * | 11/1993 | Weissbrich et al. ............ 454/75 |
| 5,278,547 A | * | 1/1994 | Suman et al. ............... 340/5.22 |
| 5,698,907 A | | 12/1997 | Weber ......................... 307/101 |
| 6,091,162 A | * | 7/2000 | Williams et al. ............ 307/10.1 |
| 6,111,373 A | | 8/2000 | Ohashi ........................ 318/265 |
| 6,169,379 B1 | * | 1/2001 | Zhang et al. ................ 318/280 |
| 6,243,022 B1 | * | 6/2001 | Furukawa .............. 340/825.72 |
| 6,253,135 B1 | * | 6/2001 | Hubacher ..................... 701/49 |
| 6,326,754 B1 | * | 12/2001 | Mullet et al. ................ 318/480 |
| 6,357,813 B1 | * | 3/2002 | Vandeberghe et al. ...... 296/57.1 |
| 2002/0121872 A1 | * | 9/2002 | Boisvert et al. ............. 318/469 |
| 2003/0007851 A1 | * | 1/2003 | Heigl et al. .................. 414/454 |

* cited by examiner

Primary Examiner—Thomas G. Black
Assistant Examiner—Ronnie Mancho

(57) ABSTRACT

A powered window system for a vehicle is disclosed. The powered window system includes a window moveable between an open and a closed position. A motor is coupled to the window. The motor causes selective movement of the window. At least one of a switch and a communications bus is coupled to the motor. A processor is coupled to at least one of the switch and the communications bus and is configured to selectively send at least one of close and open signals to at least one of the switch and the communications bus. A sensor is coupled to the processor and senses conditions on which automated window closure is based. The sensor sends condition signals to the processor. The processor interprets the condition signals and selectively sends a closed signal to at least one of the switch and the communications bus when the conditional signal exceeds a prescribed threshold.

25 Claims, 4 Drawing Sheets

AUTOMATED CLOSURE SYSTEM AND METHOD

CROSS-REFERENCE TO RELATED PATENT APPLICATIONS

This application claims the benefit of U.S. Provisional Application No. 60/280,022, filed Mar. 30, 2001, the entirety of which is herein incorporated by reference.

BACKGROUND

The present invention relates generally to the field of automated vehicle systems. More specifically, the present invention relates to an automated closure system for a vehicle. More specifically still, the present invention relates to an automated window closure system in which the window may be automatically closed and/or opened depending on the speed of the vehicle.

Because of the ease of use of powered windows and other powered closures, vehicle drivers and passengers often utilize powered window systems to provide selective cooling to the interior of the passenger compartment. However, having a window in an automobile or other vehicle open at high speeds may cause an undesirable amount of air flowing into the vehicle (due to the high speed of the vehicle) and/or may cause excessive noise, both which may be bothersome to drivers and/or passengers of the vehicle. Therefore, using conventional systems, users of the vehicle may roll down a vehicle window when the vehicle comes to a stop or is moving at a slow speed, such as when the vehicle approaches and/or comes to a red light or stop sign. In such a situation, once the light turns green and the vehicle proceeds once again and reaches a higher speed, the open window may become undesirable and the user or operator of the window may be required to cause the window to be rolled up by using the power window switch.

In stop-and-go type traffic, in city driving, or other situations, this manual closing and opening of the powered windows may be carried out numerous times during a particular trip and may become tedious or annoying to the driver and/or passengers in the vehicle.

Accordingly, there is a need for an automated closure system which solves many of the disadvantages provided by conventional vehicle power closure systems. There is also a need for a powered window system for a vehicle that selectively opens and/or closes the vehicle windows based on the vehicle speed and/or other environmental variables.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a powered window system for a vehicle. The powered window system includes a window movable between an open and a closed position. The powered window system also includes a motor coupled to the window, the motor selectively causing movement of the window. Further, the powered window system includes at least one of a switch and a communications bus coupled to the motor. Further, the powered window system includes a processor coupled to at least one of the switch and the communications bus and configured to selectively send at least one of close and open signals to at least one of the switch and the communications bus. Further still, the powered window system includes a sensor coupled to the processor and sensing conditions on which automated window closure is based. The sensor sends condition signals to the processor. The processor interprets the condition signals and selectively sends a closed signal to at least one of the switch and the communications bus when the condition signal exceeds a prescribed threshold.

Another exemplary embodiment relates to a method of causing a vehicle window to close. The method includes sensing via an electronic sensor an environmental condition. The method also includes sending an environmental condition signal to a switching circuit. Further, the method includes comparing the environmental condition signal to a prescribed threshold. Further still, the method includes causing the vehicle window to close automatically when the environmental condition signal meets the threshold in accordance with a first relationship, by using the switching circuit.

Yet another exemplary embodiment relates to a power closure system for a vehicle. The powered closure system includes a closure member movable between an open and a closed position. The powered closure system also includes a motor coupled to the closure member. The motor selectively causes movement of the closure member. The powered closure system also includes at least one of a switch and a communications bus coupled to the motor. Further, the powered closure system includes a processor coupled to at least one of the switch and the communications bus and configured to selectively send at least one of close and open signals to at least one of the switch and the communications bus. Further still, the powered closure system includes a sensor coupled to the processor and sensing conditions on which automated closure member closure is based. The sensor sends condition signals to the processor. The processor interprets the condition signals and selectively sends a close signal to at least one of the switch and the communications bus when the condition signal meets a prescribed threshold.

Yet still another exemplary embodiment relates to a method of causing a vehicle member to close. The method includes sensing via an electronic sensor and environmental condition. The method also includes sending an environmental condition signal to a switching circuit. Further, the method includes preparing the environmental condition signal to a prescribed threshold. Yet further still, the method includes causing the vehicle member to close automatically when the environmental signal violates the threshold, by using the switching circuit.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
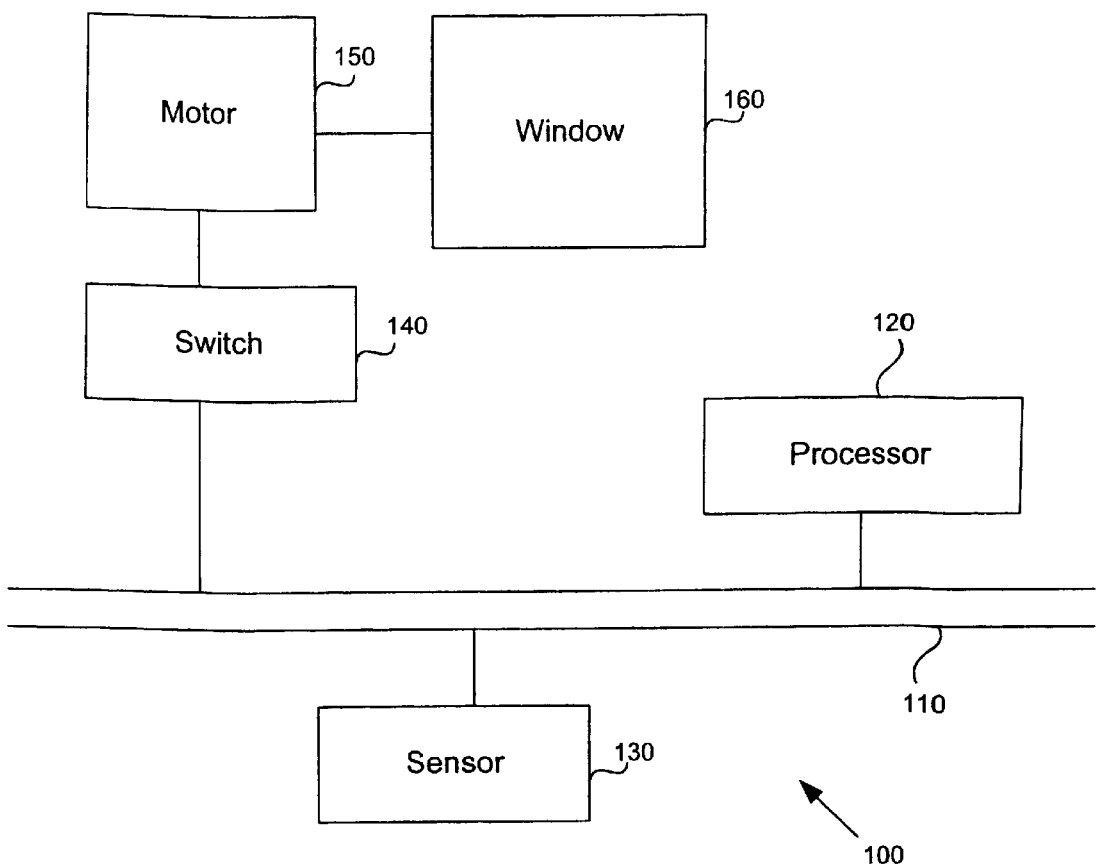
FIG. 1 is a block diagram representation of a vehicle communications bus and associated hardware for a vehicle closure system.

Referring to FIG. 1, a system for providing automated closure of a powered window 100 is depicted. System 100 includes a vehicle communications bus 110 that provides communications for electronic devices on the vehicle. Communications bus 110 may be coupled to and in communication with a processor 120 which provides processing capabilities for the vehicle. Further, a sensor 130 may be coupled to communications bus 110 and providing sensing capabilities for the system 100. In an exemplary embodiment, sensor 130 may be a vehicle speed sensor. However, any of a variety of other types of sensors may also be used including, but not limited to, temperature sensors, rain sensors, radio frequency receivers, and the like. Also coupled to communications bus 110 is a switch 140 that receives a switching signal from processor 120. Switch 140 either activates or deactivates a motor 150. Motor 150 effects the movement (up or down, open or closed) of a window 160. In an alternative embodiment, communications bus 110 may be coupled directly to motor 150. Switching of motor 150 to drive window 160 open or closed is then accomplished by signaling motor 150 to move window 160 in an open or closed direction. In an alternative embodiment, motor 150 may control a variety of other closure-type members including, but not limited to, sliding doors, lift gates, sunroofs and moon roofs, convertible tops, rear back light windows, etc. Such powered closure member systems including a manual switch, a motor and a closure member are well known to those skilled in the art.

As an alternative embodiment, system 100 may not require the use of a communications bus, instead a logic device such as an application specific integrated circuit (ASIC) may be coupled to the sensor and switch. The ASIC would then be programmed with suitable logic for carrying the inventive system. Further still, any of a variety of other logic circuits could be designed by one having ordinary skill in the art to effectuate the inventive system described.

Figure 2:
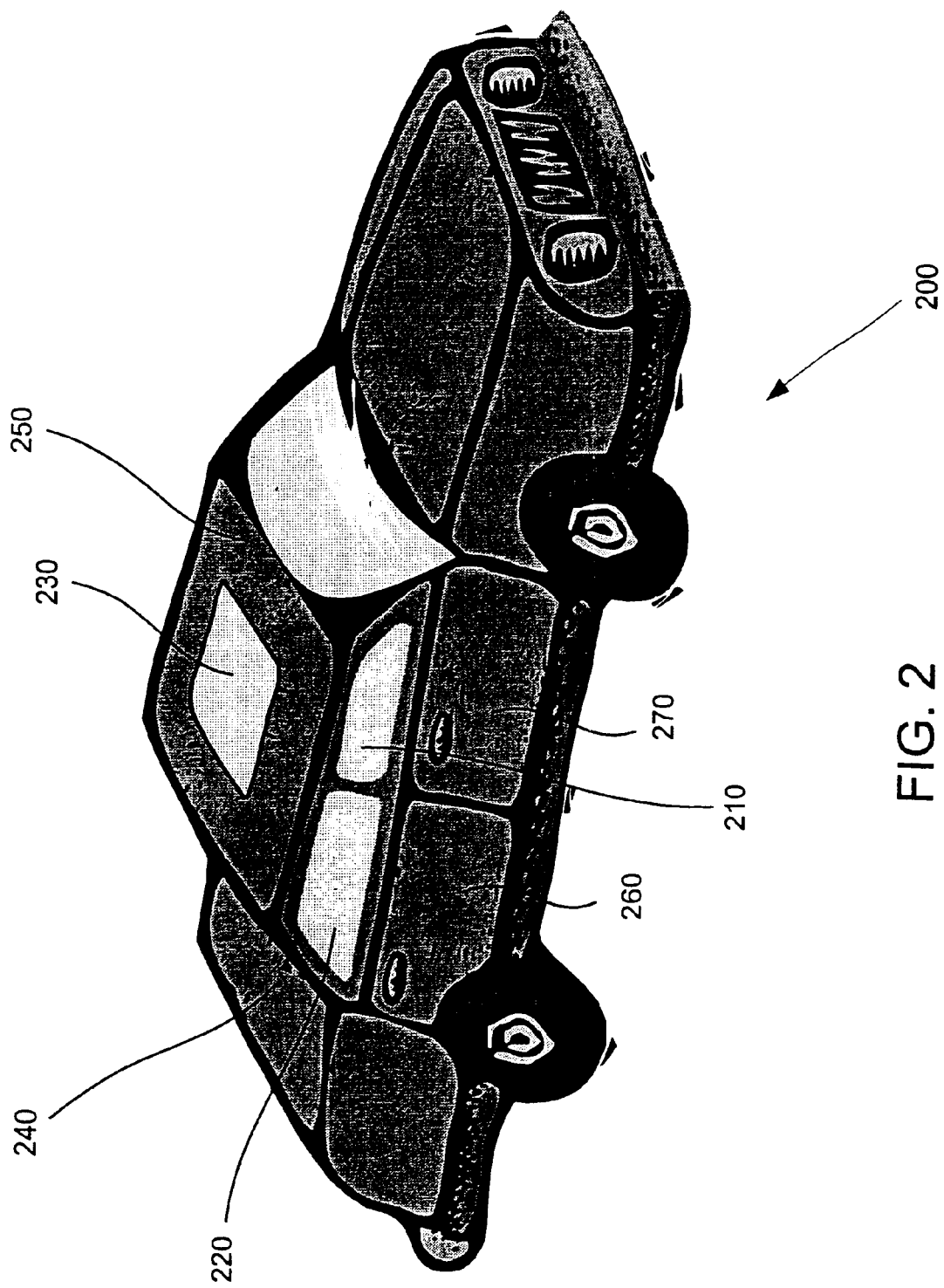
FIG. 2 is an exemplary illustration of a vehicle utilizing the inventive vehicle closure system.

Referring now to FIG. 2, a vehicle, shown as a car 200, depicts a variety of locations in which the vehicle closure member system may be employed. In an exemplary embodiment, the system may be employed to cause and effectuate movement of any of a number of closure members, including but not limited to a front side window 210, a rear side window 220, a moon roof or sunroof 230, a rear lift gate (especially in a truck application) or trunk lid 240, a rear window (such as a rear back light window in a pickup truck), etc. Further, in an exemplary embodiment, top 250 may be a convertible top and movement of the convertible top may be effectuated by the inventive system disclosed. Further still, in an exemplary embodiment, doors 260 and 270 may be open and/or closed in an automated manner according to the inventive system described. Doors 260 and 270 may be in an exemplary embodiment traditional swinging doors or powered sliding doors (particularly in a van or mini-van application).

Figure 3:
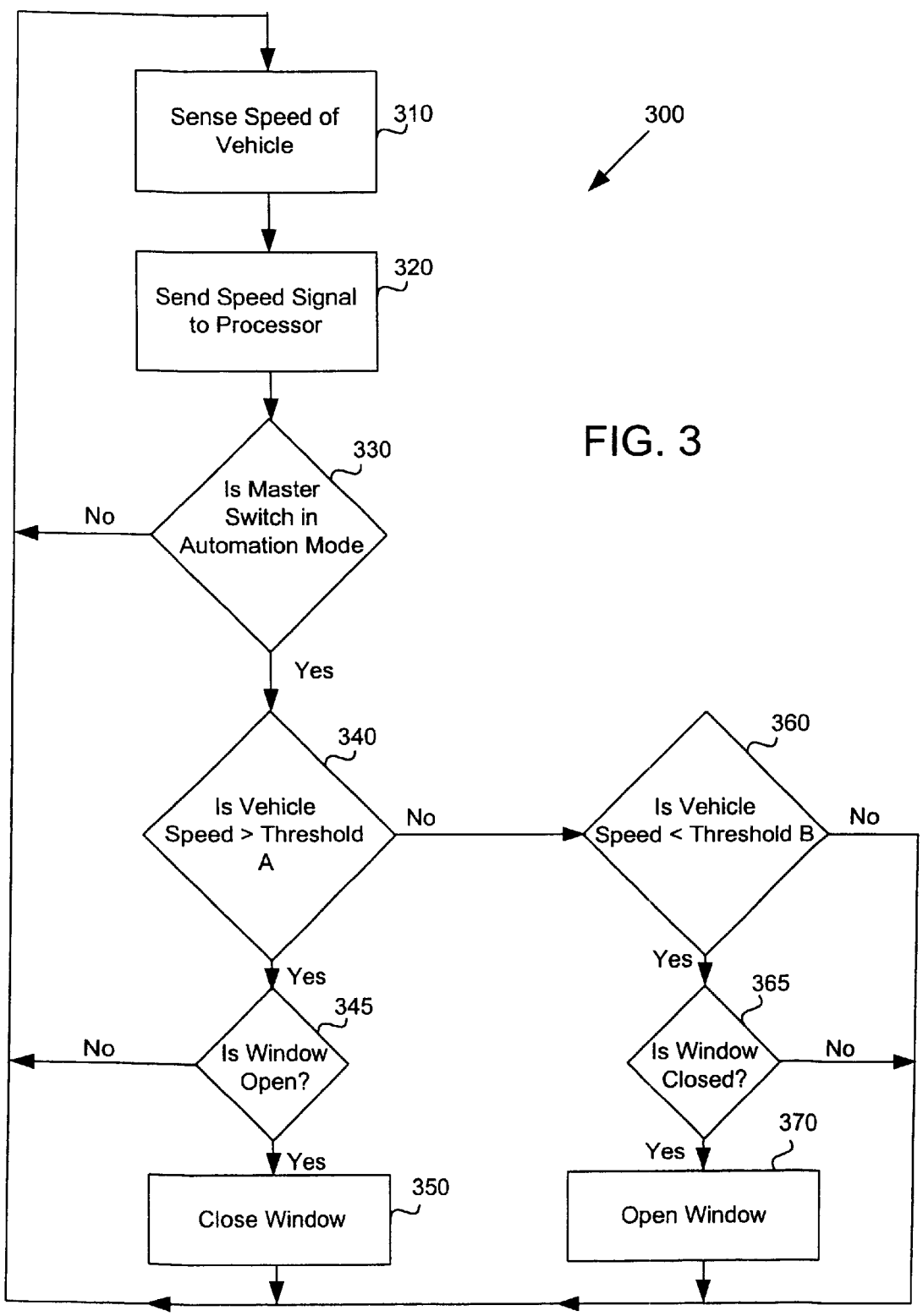
FIG. 3 is a flow diagram depicting a process for providing automated window closure in a vehicle.
Figure 4:
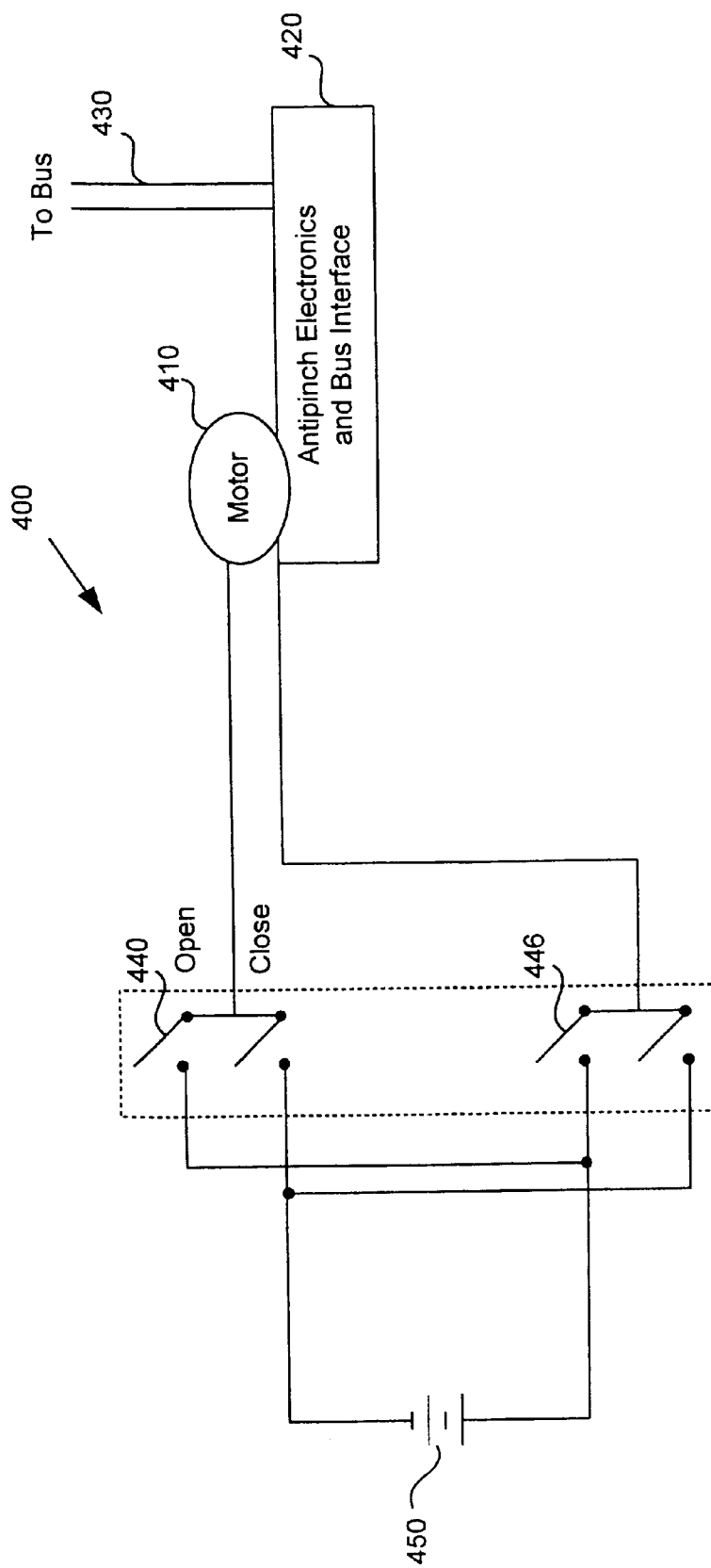
FIG. 4 is an exemplary schematic diagram of a window closing system.

Referring now to FIG. 3, a process 300 is depicted. Process 300 is an exemplary embodiment of a process used to provide closure of a closure member like a vehicle window upon the sensing of a specified condition. In the exemplary embodiment depicted, the vehicle speed is initially sensed by a sensor on the vehicle (step 310). The speed signal is then sent to a processor for interpretation thereof (step 320). Once the speed signal has been interpreted and processed, the system is then configured to check whether a master switch indicates that the system is in an automation mode (step 330). If the master switch is not in an automation mode, the position of the window is not affected. If, however, the master switch indicates that the automation mode is turned on, the vehicle speed is then compared to specified thresholds. For example, the vehicle speed is first compared to a threshold A, that is whether the vehicle speed is greater than a specified speed (step 340). If the vehicle speed is greater than a specified threshold, then a signal to close the window is commanded, provided that the window is in the open position (step 345) and the window is closed. If, however, the vehicle speed is not greater than a specified threshold, the vehicle speed is then compared against a threshold B to determine whether the vehicle speed is below the threshold B (step 360). If the vehicle speed is not below the threshold B, the position of the window is not affected. If, however, the vehicle speed is below the threshold B, the window is then commanded to open, provided that the window is in the closed position (step 365) and the window is opened (step 370).

In an exemplary embodiment, it may be desirable to include with the inventive system an anti-pinch or closing force limitation system. An anti-pinch or closing force limitation system would thereby sense either by proximity or by touch or resistance of a closing window that an object was or may be impeding the progress of the closing window. If such an object is sensed, the window would either reverse direction or cease the closing process. Once the directions of the window is changed or movement is stopped, the system may be configured to attempt window closure again after a predetermined time period or may be configured to wait for manual closure via switch activation.

In another exemplary embodiment, the threshold may be a factory set or preset threshold or may be a user set threshold. For example, if the environmental condition that is being sensed is speed of the vehicle, a user may be allowed to set a specific speed at which the user desires the window to be rolled up or down. In a particular but non-limiting example, a user may desire that the window be automatically rolled down if the vehicle reaches less than 10 miles per hour. Further, the user may desire that the window be automatically rolled back up when the vehicle speed exceeds 25 miles per hour. However, any of a variety of other vehicle speeds may be set by the user or preset at the factory or by a servicer.

In yet another exemplary embodiment, there may be an on/off switch in which the automated closure system may be turned on or off by a user. For example, if the automated closure system is being used on vehicle windows, there may be an on/off switch for each window and/or there may be a master switch in which the system is disabled for the entire vehicle.

In another exemplary embodiment, sensor 130 of FIG. 1 may be a radio frequency (RF) receiver. The RF receiver may be utilized to receive radio frequency signals from a variety of sources. For example, an RF signal may be sent by an RF transmitter at a toll plaza. When the car drives into the toll plaza, the sensor picks up the RF signal and the window is automatically rolled down. As the vehicle drives away from the toll plaza and no longer receives the signal, the window would be automatically rolled back up. Similarly, an automated system using an RF receiver may be utilized for drive-thru restaurants and the like. As the vehicle approaches the drive-thru (for example, the vehicle approaches the speaker and microphone at the ordering kiosk or window of the drive-thru), the window would be automatically rolled down after receiving an RF signal from a transmitter at the drive-thru kiosk or window. After the kiosk is left, the window would be automatically rolled up until the driver reaches the payment window or product pickup window at which point the window would then again be automatically rolled down upon receipt of an RF signal.

In yet another exemplary embodiment, sensor 130 may be any of a variety of sensors including a temperature sensor. The temperature sensor may be located inside the vehicle or passenger compartment such that when a certain temperature is reached in the vehicle, the window is automatically rolled down. Similarly, the system could be used such that the sunroof or moon roof is opened upon reaching a certain temperature inside the passenger compartment.

Further still, a noise sensor may be used for sensor 130. Such a noise sensor would be located in the passenger compartment such that if the windows in the vehicle are rolled down and the sensor detects a certain level of noise, due to air entering the vehicle windows or from other external noises (e.g., jackhammer, traffic noises, etc.), the windows would then be automatically rolled up.

In yet another exemplary embodiment, a rain sensor on the vehicle may be used for sensor 130 to detect the presence of rain or other precipitation hitting the vehicle. If a certain amount of precipitation is detected, and the windows, sunroof, moon roof, convertible top is in the open position, then the top, roofs, or windows would be automatically moved to the closed positions (taking vehicle speed into consideration where applicable so as not to cause vehicle damage).

In yet still another exemplary embodiment, a window closing system 400 may be used to employ the inventive system described. A drive motor 410 is coupled to the window to drive the window into an open or closed position. Motor 410 is coupled to anti-pinch electronics and a bus interface 420 is coupled to a vehicle communications bus 430. Commands for automatically opening and closing the window may be communicated over bus 430 to motor 410. Further, the motion of motor 410 may be effectuated via a manually operated switch 440 which, in an exemplary embodiment, is a trim switch located on a door panel. Switch 440 includes two operative switches, a switch 444 which, when actuated, causes motor 410 to effectuate window opening movement and a switch 446 which, when actuated, causes motor 410 to effectuate a window closing movement. Switches 444 and 446 are coupled to a power source 450, which may be the vehicle battery or other power source, and which provides a voltage signal to motor 410 to cause the required action of the motor. Accordingly, the switching in system 400 may be accomplished via a conventional relay or solid state switching device or over communications bus 430. Further, in an exemplary embodiment, module 420, including a bus interface and anti-pinch electronics, may be stand-alone modules or they may be integrated into motor 410.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A powered window system for a vehicle, comprising:
   a window movable between an open and a closed position;
   a motor coupled to the window, the motor selectively causing movement of the window;
   at least one of a switch and a communications bus coupled to the motor;
   a processor coupled to at least one of the switch and the communications bus and configured to selectively send at least one of close and open signals to one of the switch and communications bus; and
   at least one sensor coupled to the processor and sensing conditions on which automated closure of the window is based, the at least one sensor sending at least one condition signals to the processor,
   wherein the processor interprets the at least one condition signals and selectively sends a close signal to at least one of the switch and the communications bus when the at least one condition signal exceeds a prescribed threshold,
   wherein the at least one sensor is selected from the group of sensors of a noise sensor and a vehicle speed sensor.

2. The powered window system of claim 1, further comprising an anti-pinch system that overrides automated window closure under specific conditions.

3. The powered window system of claim 1, further comprising a closing force limitation system that overrides automated window closure under specific conditions.

4. The powered window system of claim 1, wherein the window is automatically rolled up when the vehicle exceeds a predefined speed and the window is rolled down when the vehicle falls below a predefined speed.

5. The powered window system of claim 1, further comprising an additional sensor coupled to the processor and sensing additional conditions on which automated window closure is based, the additional sensor sending additional condition signals to the processor wherein the processor interprets the additional condition signals and selectively sends a close signal to at least one of the switch and the communications bus when either the at least one condition signal exceeds its prescribed threshold or the additional condition signal exceeds an additional prescribed threshold, wherein the additional sensor is a rain sensor.

6. The powered window system of claim 1, further comprising an additional sensor coupled to the processor and sensing additional conditions on which automated window closure is based, the additional sensor sending additional condition signals to the processor wherein the processor interprets the additional condition signals and selectively sends a close signal to at least one of the switch and the communications bus when either the at least one condition signal exceeds its prescribed threshold or the additional condition signal exceeds an additional prescribed threshold, wherein the additional sensor is a temperature sensor.

7. The powered window system of claim 1, further comprising a master switch configured to selectively enable and disable the automated window closure functionality.

8. The powered window system of claim 1, wherein the system includes a radio frequency (RF) receiver configured to sense a condition supplied by a source external to the vehicle via RF communications.

9. A method of causing a vehicle window to close, comprising:
sensing via at least one electronic sensor at least one environmental condition;
sending at least one environmental condition signal to a switching circuit;
comparing the at least one sent environmental condition signal to a prescribed threshold;
causing the vehicle window to close automatically when the at least one sent environmental condition signal meets the threshold in accordance with at least one relationship, by using the switching circuit wherein the at least one sent environmental condition is selected from the group of sensors of a noise sensor and a vehicle speed sensor.

10. The method of claim 9, wherein an additional environmental condition is sensed, wherein the additional environmental condition is rain.

11. The method of claim 9, wherein an additional environmental condition is sensed, wherein the additional environmental condition is temperature inside the vehicle.

12. The method of claim 9, further comprising:
causing the vehicle window to open automatically when the environmental condition signal violates the threshold according to a second relationship, by using the switching circuit.

13. The method of claim 9, wherein an additional environmental condition is sensed, wherein the additional environmental condition signal is a radio frequency (RF) signal from an external source.

14. A powered closure system for a vehicle, comprising:
a closure member movable between an open and a closed position;
a motor coupled to the closure member, the motor selectively causing movement of the closure member;
at least one of a switch and a communications bus coupled to the motor;
a processor coupled to at least one of the switch and the communications bus and configured to selectively send at least one of close and open signals to the switch; and
a sensor coupled to the processor and sensing conditions on which automated closure member closure is based, the sensor sending condition signals to the processor,
wherein the processor interprets the condition signals and selectively sends a close signal to at least one of the switch and the communications bus when the condition signal meets a prescribed threshold,
wherein the sensor is selected from the group of sensors of a vehicle speed sensor and a noise sensor.

15. The powered closure system of claim 14, further comprising an anti-pinch system that overrides automated window closure under specified conditions.

16. The powered closure system of claim 14, further comprising a closing force limitation system that overrides automated window closure under specified conditions.

17. The powered closure system of claim 14, wherein the window is automatically rolled up when the vehicle exceeds a predefined speed and the window is automatically rolled down when the vehicle falls below a predefined speed.

18. A The powered closure system of claim 14, further comprising
an additional sensor coupled to the processor and sensing additional conditions on which automated closure member closure is based, the additional sensor sending additional condition signals to the processor,
wherein the processor interprets the additional condition signals and selectively sends a close signal to at least one of the switch and the communications bus when the additional condition signal meets a prescribed threshold, wherein the additional sensor is a rain sensor.

19. The powered closure system of claim 14, further comprising
an additional sensor coupled to the processor and sensing additional conditions on which automated closure member closure is based, the additional sensor sending additional condition signals to the processor,
wherein the processor interprets the additional condition signals and selectively sends a close signal to at least one of the switch and the communications bus when the additional condition signal meets a prescribed threshold, wherein the additional sensor is a temperature sensor.

20. The powered closure system of claim 14, wherein the closure member is at least one of a window, a lift gate, a sunroof, a moon roof, and a sliding door.

21. A method of causing a vehicle member to close, comprising:
sensing via at least one electronic sensor at least one environmental condition wherein the at least one environmental condition is selected from one of vehicle speed and noise;
sending at least one environmental condition signal to a switching circuit;
comparing the at least one environmental condition signal to at least one prescribed threshold;
causing the vehicle member to close automatically when the environmental condition signal violates the threshold, by using the switching circuit.

22. The method of claim 21, wherein an additional environmental condition is sensed, wherein the additional environmental condition is rain.

23. The method of claim 21, wherein an additional environmental condition is sensed, wherein the additional environmental condition is temperature inside the vehicle.

24. The method of claim 21, further comprising:
causing the vehicle member to open automatically when the environmental condition signal violated the threshold according to a second relationship, by using the switching circuit.

25. The method of claim 21, wherein an additional environmental condition is sensed, wherein the additional environmental condition is a radio frequency (RF) signal from an external source.

* * * * *